United States Patent [19]
Lawrence

[11] 3,833,250
[45] Sept. 3, 1974

[54] LAWN CLEANING TOOL
[76] Inventor: Elinor W. Lawrence, 8 Stanley Rd., Darien, Conn. 06820
[22] Filed: May 11, 1973
[21] Appl. No.: 359,253

[52] U.S. Cl............ 294/50.6, 56/400.12, 294/50.8
[51] Int. Cl........................... A01b 1/18, A01d 7/10
[58] Field of Search ....... 294/11, 16, 19 R, 49, 50.5, 294/50.6, 50.8, 50.9, 51, 52, 103, 104, 106; 7/1 L, 1 N, 1 P; 15/104.8, 221, 257.7; 56/400.04, 400.11, 400.12, 400.16, 400.19

[56] References Cited
UNITED STATES PATENTS

| | | | |
|---|---|---|---|
| 88,820 | 4/1869 | Stith | 294/11 |
| 1,654,958 | 1/1928 | Breton | 294/57 X |
| 1,895,214 | 1/1933 | Stork | 294/50.8 |
| 1,906,218 | 4/1933 | Patchell | 294/57 X |
| 2,189,713 | 2/1940 | Hansen | 294/19 R |
| 2,652,279 | 9/1953 | Morris | 294/50.9 |
| 3,164,945 | 1/1965 | Spencer | 56/400.12 |
| 3,672,716 | 6/1972 | Burckhalter | 294/50.6 |
| 3,692,347 | 9/1972 | Bixler | 294/50.8 X |

Primary Examiner—Evon C. Blunk
Assistant Examiner—Johnny D. Cherry
Attorney, Agent, or Firm—Curtis Ailes

[57] ABSTRACT

First and second elongated handles are hingedly connected to the respective ends of a cross-handle. Opposed rake heads are attached to the unhinged ends of the first and second handles to provide an articulated tool which is particularly useful in gathering and picking up loose materials such as tree leaves.

10 Claims, 4 Drawing Figures

LAWN CLEANING TOOL

This invention pertains to a lawn cleaning tool, and more particularly to a device which is very efficient in gathering loose materials such as tree leaves for moving such materials into a container, or to a central storage location for removal or destruction.

One of the most inefficient aspects of lawn clean-up work such as raking leaves, and other debris is in picking up and moving the loose debris after such materials have been gathered into small piles. Typically, the loose materials are picked up between the rake and one hand of the user of the rake. However, the limited area of one's hand seriously limits the amount of loose materials which can be lifted and moved in this manner.

Accordingly, it is one object of the present invention to provide a lawn cleaning tool which is much more efficient in picking up loose materials, such as leaves, for moving the materials or for loading them into a container.

Prior attempts have been made to provide a lawn cleaning tool employing two rake heads hinged together to provide a clamshell-like structure for engaging loose materials for picking them up. However, such prior art structures have been deficient in their capacity for picking up materials, and deficient in the ease and efficiency with which substantially all of the loose materials in the group to be gathered can be picked up.

Accordingly, it is another object of the invention to provide an improved lawn cleaning tool which is much more efficient in picking up all of the loose materials in a group of such materials and in picking up a large quantity of such materials at once.

Further objects and advantages of the invention will be apparent from the following description and the accompanying drawings.

The invention may be carried out by providing a lawn cleaning tool comprising a first rake head and a first elongated handle of substantially uniform cross-section attached at one end to said first rake head. The tool includes a second rake head and a second elongated handle of substantially uniform cross-section attached at one end to said second rake head. A cross-handle of substantially uniform cross-section is provided and the ends of said first and second handles opposite to the ends of attachment to said rake heads are hingedly attached respectively to the opposite ends of said cross-handle and arranged for free hinged movement thereon to provide an articulated structure. The pivot axes of said hinged attachments are substantially mutually parallel and the transverse alignment of each of said rake heads upon said first and second handles is substantially parallel to said pivot axes of said hinged attachments. Said rake heads are mounted so that the tines of each rake head extend towards the opposite rake head when said first and second handles are moved about said hinged attachments to bring said rake heads toward one another to thereby facilitate gathering and picking up a quantity of loose materials such as leaves.

Figure 1:
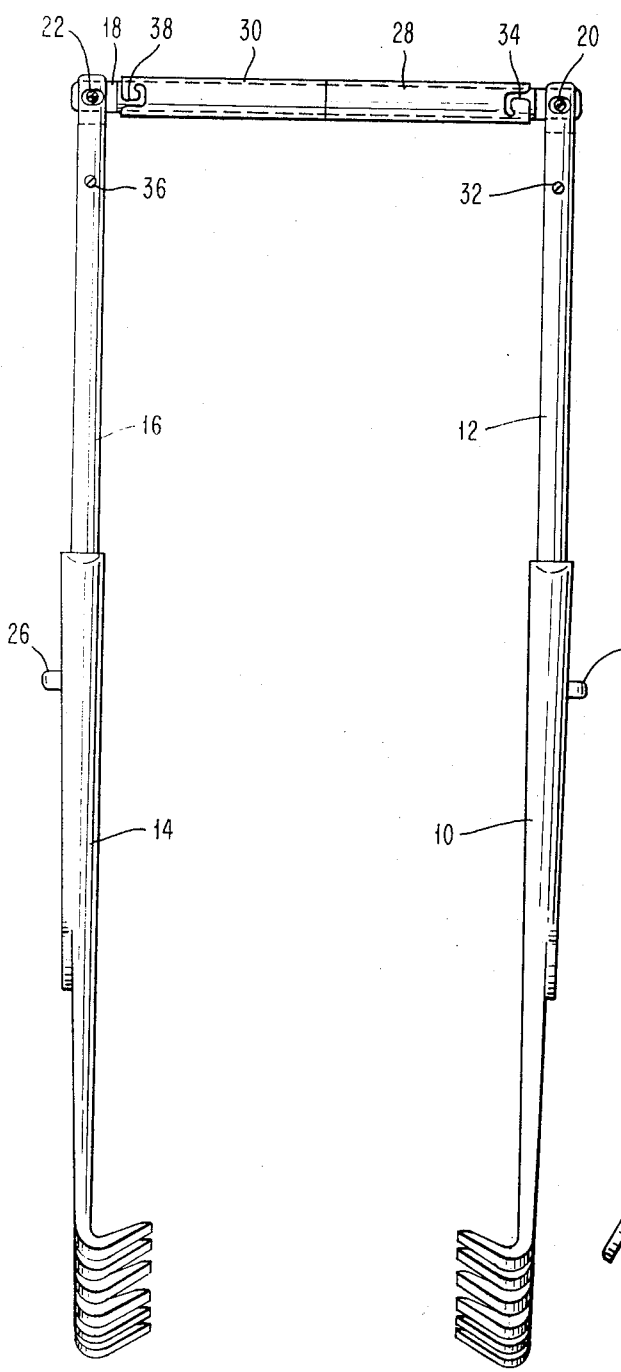
FIG. 1 is a side view of a preferred embodiment of a lawn cleaning tool in accordance with the present invention.
Figure 4:
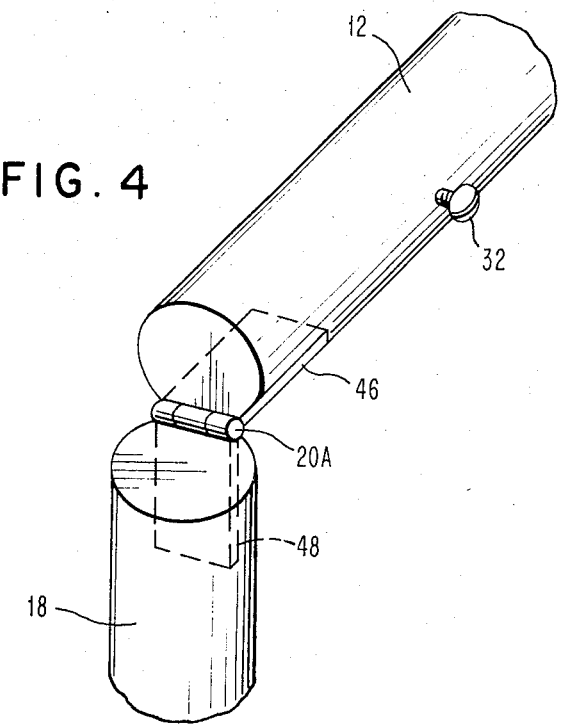

And FIG. 4 is a perspective detail view illustrating an alternative structure of the hinged attachments of the handles of the tool of FIG. 1.

Referring in more detail to FIG. 1 of the drawings, the tool includes a first rake head 10 and a first elongated handle 12, which may be circular in cross-section, attached at its lower end to the rake head 10. The tool also includes a second rake head 14, and a second elongated circular cross-section handle 16 attached at its lower end to the handle 14. A cross-handle 18 is hingedly attached at its opposite ends to the upper ends of the handles 12 and 16, as indicated by pivot pins 20 and 22. As illustrated in the drawing, the pivot axes of the hinged attachments, as determined by the axes of the pivot pins 20 and 22, are mutually parallel, both being perpendicular to the plane of the drawing in FIG. 1. Furthermore, the transverse alignment of each of the rake heads 10 and 14 upon the first and second handles 12 and 16 is substantially parallel to the pivot axes of the hinged attachments at the pivot pins 20 and 22. The tips of the tines of the rake heads are mounted so that they face one another. By reason of this geometry of the tool, the user can operate the tool by grasping the first and second handles 12 and 16 respectively in his right and left hands, and he can spread the rake heads apart at the same time and then engage them both with the ground and move them towards one another in a concerted movement to gather and pick up a large pile of loose refuse or debris such as fallen leaves. The user may also hold one of the handles and rake heads such as 16–14, stationary and he can then independently extend the handle 12 and the rake head 10 outwardly and downwardly, because of the articulated movement provided by the two pivot hinges 20 and 22. He may then pull the rake head 10 towards the rake head 14, while the rake head 10 is in engagement with the ground, in order to rake loose refuse from the margins of a pile of such refuse into the main pile to be picked up and moved.

When the two rake heads 10 and 14 are brought together to engage the two sides of a pile of loose debris such as leaves, they are extremely efficient in engaging and lifting most of such a pile so that the debris can be carried to a collection point or can be efficiently inserted into a container such as a garden cart or a plastic refuse bag.

It is another useful feature of the invention that there are preferably provided separate handles 24 and 26 attached to what may be characterized as the top side of the respective rake heads 10 and 14. These handles may be similar to a conventional bar pull handle and provide for easier operation of the tool. The operator holds the tool by means of the handles 24 and 26 while it is being operated, rather than by the elongated handles 12 and 16. The bar pull handles are illustrated more clearly in FIG. 2 at 24.

While various types of rake heads may be employed in carrying out this invention, the preferred type of rake head is one which corresponds to that used on a conventional leaf rake. Such rake heads may be composed of bamboo strips or metal tines, or, as in the embodiment illustrated, the rake heads may be formed of molded plastic. As shown in the drawings, the rake heads may preferably have a conventional leaf rake head configuration in which the tines are arranged generally in a configuration resembling a sector of a circle.

The handles 12, 16 and 18 may be composed of various materials, but circular cross-section wooden handles have been found to be quite satisfactory.

In accordance with another aspect of the invention, the hinged connections provided by the pivot pins 20 and 22 can be locked so that the first and second handles 12 and 16 may be maintained in axial alignment with the cross-handle 18. This locking may be accomplished by means of locking sleeves 28 and 30 which are slidably held in a storage position upon the cross-handle 18, as shown in FIG. 1. When the hinged connection at pivot 20 is to be locked, the handle 12 is first rotated out and and upwardly until it is in axial alignment with the cross-handle. The sleeve 28 is then slipped over the hinged joint at pivot 20 until it engages with a locking screw 32. The sleeve 28 includes a locking slot indicated at 34 which permits the sleeve 28 to be moved such that the slot 34 accommodates the locking screw 32. When the axial movement of the sleeve 28 is completed, the sleeve is then rotated to engage the L-shaped end of the slot 34 to thus lock the sleeve in place over the joint. The sleeve 30 is likewise locked upon a locking screw 36 by means of a slot 38. With both locking sleeves 28 and 30 in the locked positions, all of the handles 12, 16, and 18 are held in an axially aligned position, and the lawn cleaning tool of this invention can be used in a conventional manner as a lawn rake, employing either rake head for the raking operation. However, in such operations, it has been found that the bar pull handles 24 and 26 are useful in providing for convenient and less tiring operation. The bar pull handle upon the rake head which is not in engagement with the ground is particularly useful for use by the operator in grasping the upper end of the combination tool when it is employed for conventional raking operations.

Figure 2:
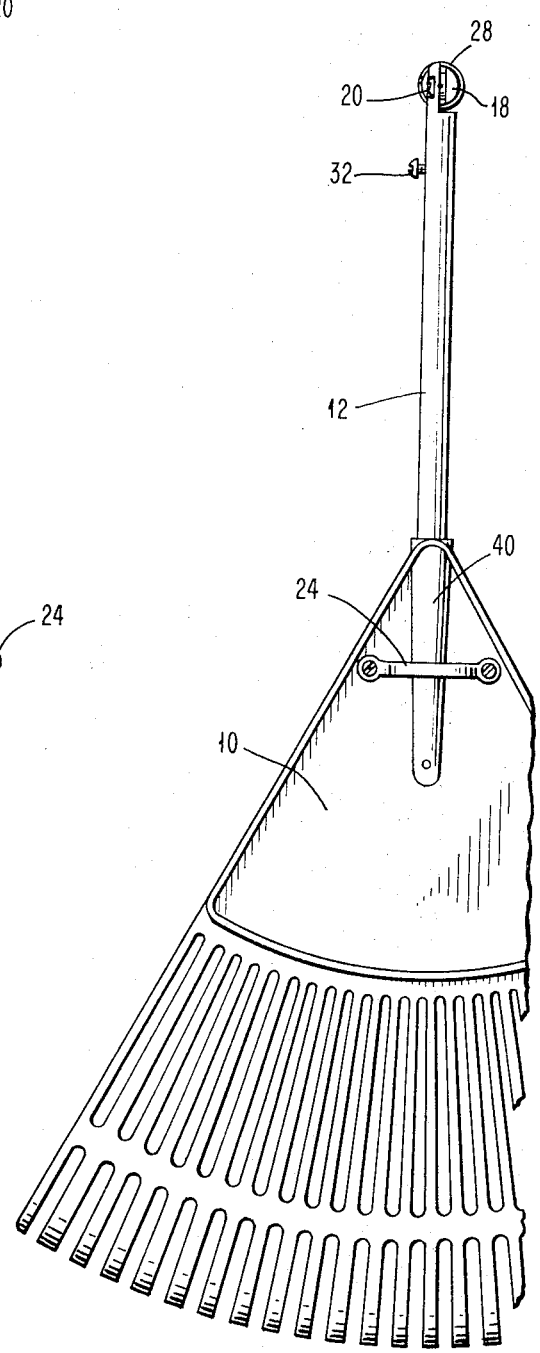
FIG. 2 is an end view of the tool of FIG. 1.

FIG. 2 is an end view illustrating the handle 12 and the rake head 10 in somewhat more detail. With the rake head as shown, the handle 12 may be attached to the rake head 10 by providing a tapered end on the handle 12 which fits into a tapered socket, generally indicated at 40, which is molded into the upper end of the rake head 10. The handle may be anchored into the socket 40 by means of a screw (not shown) extending through the wall of the socket into the handle, or by means of an adhesive.

Figure 3:
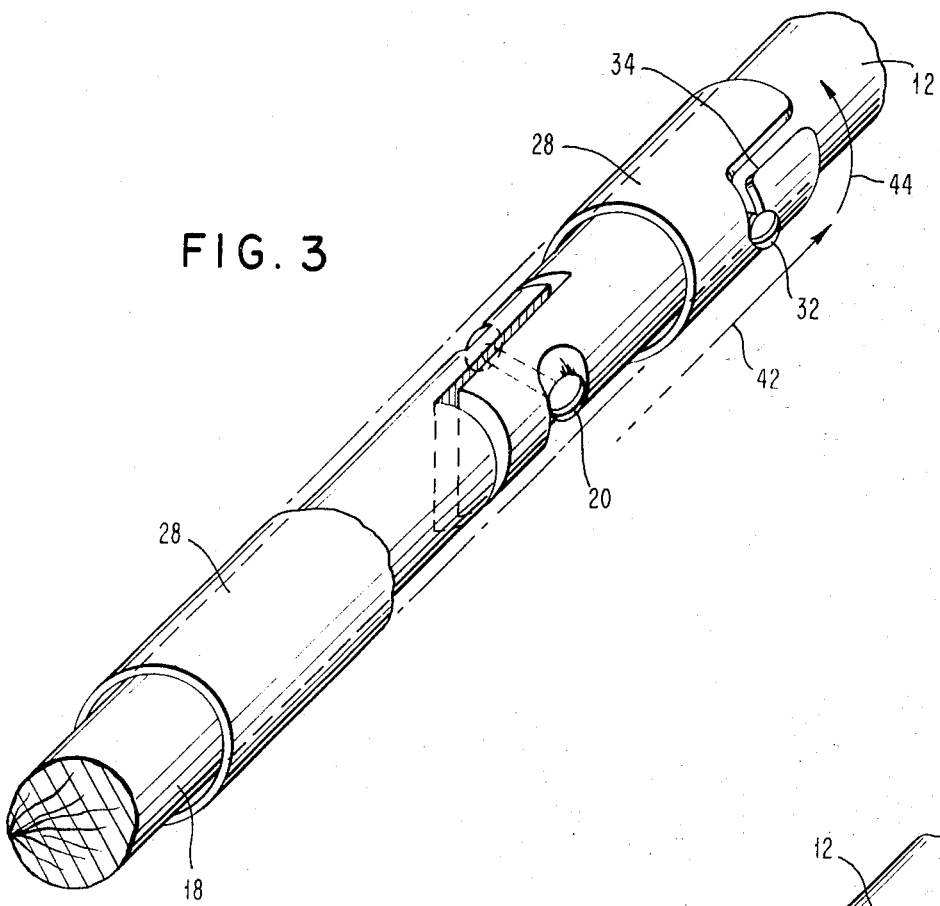
FIG. 3 is an enlarged, perspective detail view, partially cut away, illustrating the operation of the locking sleeves for locking the hinged joints of the tool of FIG. 1.

FIG. 3 is a perspective detail view, partially cut away, illustrating the structure of the hinged connection at pivot 20 between the handle 12 and the cross-handle 18. This figure also illustrates the mode of operation of the locking sleeve 28 when moved over this hinged attachment. As previously explained, after the two handles are placed in axial alignment with one another, the sleeve 28 is moved axially over the joint. This movement is illustrated by the arrow 42. After the sleeve is moved to its full axial distance such that the locking screw 32 engages the bottom of the slot 34, the sleeve 28 is then rotated, as indicated by the arrow 44, to engage the L-shaped end of the slot 34 with the locking screw 32 so that the sleeve is no longer free to move in an axial direction. It has been found, as a practical matter, that the sleeve will not normally rotate during use of the tool in the locked condition so that the sleeve will not unlock.

FIG. 4 is a perspective detail view illustrating a modification of the invention in which the hinged connection between the handle 12 and the cross-handle 18 is provided by a strap hinge 20A, having hinge straps or plates, as indicated at 46 and 48, respectively connected to the two handles. The attachments of the hinge straps or hinge plates 46 and 48 to the handles may be carried out by means of an adhesive, or by means of the more conventional screw attachments.

From the above description, it is believed to be clear that all of the objectives of the invention have been realized by the invention.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A lawn cleaning tool comprising
   a first rake head,
   a first elongated handle of substantially uniform cross-section attached at one end to said first rake head,
   a second rake head,
   a second elongated handle of substantially uniform cross-section attached at one end to said second rake head,
   a cross-handle of substantially uniform cross-section, the ends of said first and second handles opposite to the ends of attachment to said rake heads being hingedly attached respectively to the opposite ends of said cross-handle and arranged for free hinged movement thereon to provide an articulated structure,
   the pivot axes of said hinged attachments being substantially mutually parallel,
   the transverse alignment of each of said rake heads upon said first and second handles being substantially parallel to said pivot axes of said hinged attachments,
   said rake heads being mounted so that the tines of each rake head extend towards the opposite rake head when said first and second handles are moved about said hinged attachments to being said rake heads toward one another to thereby facilitate gathering and picking up a quantity of loose materials such as leaves.

2. A lawn cleaning tool as claimed in claim 1 wherein said leaf rake heads are each formed with the tines fanning out to define a sector of a circle.

3. A tool as claimed in claim 1 wherein
   each of said rake heads includes a handle comprised of a bar pull handle attached to the top side of said rake head and arranged transversely to the elongated handle associated with said rake head.

4. A tool as claimed in claim 1 wherein
   said first and second elongated handles and said cross-handle are all circular in cross-section.

5. A tool as claimed in claim 1 wherein said hinged attachments of said first and second handles to said cross-handle each comprise a pivot pin extending transversely through the attached handle ends.

6. A tool as claimed in claim 1 wherein
said hinged attachments are comprised of metal strap hinges having hinge plates respectively connected to the attached handle ends.

7. A tool as claimed in claim 1 wherein
there is provided a means for locking at least one of said hinged attachments between said cross-handle and one of said first and second handles to thereby maintain said cross-handle in longitudinal alignment with the handle with which said cross-handle is locked.

8. A tool as claimed in claim 7 wherein
separate means are provided respectively for locking both said first handle and said second handle to said cross-handle in longitudinal alignment therewith.

9. A tool as claimed in claim 8 wherein
each of said locking means comprises a sleeve slidable over each of the joints formed by said hinged attachments of said first and second handles to said cross-handle,
said sleeves being retractable away from said joints to unlock said joints.

10. A tool as claimed in claim 9 wherein
means is provided for securing each of said sleeves in the locked position over said joints.

* * * * *

PO-1050
(5/69)

UNITED STATES PATENT OFFICE
CERTIFICATE OF CORRECTION

Patent No. 3,833,250            Dated September 3, 1974

Inventor(s) ELINOR W. LAWRENCE

It is certified that error appears in the above-identified patent and that said Letters Patent are hereby corrected as shown below:

Column 4, line 51, "being" should read --bring--.

Signed and sealed this 19th day of November 1974.

(SEAL)
Attest:

McCOY M. GIBSON JR.          C. MARSHALL DANN
Attesting Officer            Commissioner of Patents